(12) United States Patent
Bazakos et al.

(10) Patent No.: US 7,843,313 B2
(45) Date of Patent: *Nov. 30, 2010

(54) DISTRIBUTED STAND-OFF VERIFICATION AND FACE RECOGNITION SYSTEMS (FRS)

(75) Inventors: Michael E. Bazakos, Bloomington, MN (US); David W. Meyers, Brooklyn Park, MN (US)

(73) Assignee: Honeywell International Inc., Morristown, NJ (US)

( * ) Notice: Subject to any disclaimer, the term of this patent is extended or adjusted under 35 U.S.C. 154(b) by 861 days.

This patent is subject to a terminal disclaimer.

(21) Appl. No.: 11/290,523

(22) Filed: Dec. 1, 2005

(65) Prior Publication Data

US 2006/0082438 A1    Apr. 20, 2006

Related U.S. Application Data

(63) Continuation-in-part of application No. 10/655,124, filed on Sep. 5, 2003, now Pat. No. 7,183,895.

(51) Int. Cl.
*B60R 25/00* (2006.01)
(52) U.S. Cl. .................. 340/5.7; 340/550; 340/5.82
(58) Field of Classification Search .......... 340/5.53, 340/550, 5.82, 5.81, 5.83, 10.1; 382/115; 235/375
See application file for complete search history.

(56) References Cited

U.S. PATENT DOCUMENTS

| | | | |
|---|---|---|---|
| 6,657,538 B1 * | 12/2003 | Ritter | 340/5.81 |
| 6,867,683 B2 * | 3/2005 | Calvesio et al. | 340/5.52 |
| 7,183,895 B2 * | 2/2007 | Bazakos et al. | 340/5.7 |
| 2002/0001468 A1 | 1/2002 | Kaku | |

(Continued)

FOREIGN PATENT DOCUMENTS

| | | |
|---|---|---|
| WO | WO02/095657 A2 | 11/2002 |
| WO | WO02/095657 A3 | 11/2002 |

OTHER PUBLICATIONS

PCT—Notification of Transmittal of the International Search Report and the Written Opinion of the International Searching Authority, or the Declaration, Date of Mailing: Jun. 5, 2008.

*Primary Examiner*—Vernal U Brown
(74) *Attorney, Agent, or Firm*—Matthew F. Lambrinos; Kermit D. Lopez; Luis M. Ortiz

(57) ABSTRACT

A system for providing stand-off biometric verification of a driver of a vehicle while the vehicle is moving and/or a person on foot at a control gate, including an RFID vehicle tag reader, an RFID personal smart card reader and a facial detection and recognition (verification) system. The driver carries a RFID personal smart card that stores personal information of the driver and a face template of the driver. The vehicle carries a RFID vehicle tag that stores information regarding the vehicle. When the vehicle approaches the control gate, the RFID vehicle tag reader reads data from the RFID vehicle tag and the RFID personal tag reader reads data from the RFID personal smart card. The facial detection and verification system scans and reads a facial image for the driver. All the data and facial images detected by the readers are sent to a local computer at the control gate for further processing (final face verification). The local computer at the control gate decodes and retrieves the face template from the data read from the RFID personal smart card.

18 Claims, 9 Drawing Sheets

U.S. PATENT DOCUMENTS

2004/0002894 A1 1/2004 Kocher
2005/0055582 A1 3/2005 Bazakos et al.
2005/0205668 A1 9/2005 Sogo
2005/0218215 A1 10/2005 Lauden

* cited by examiner

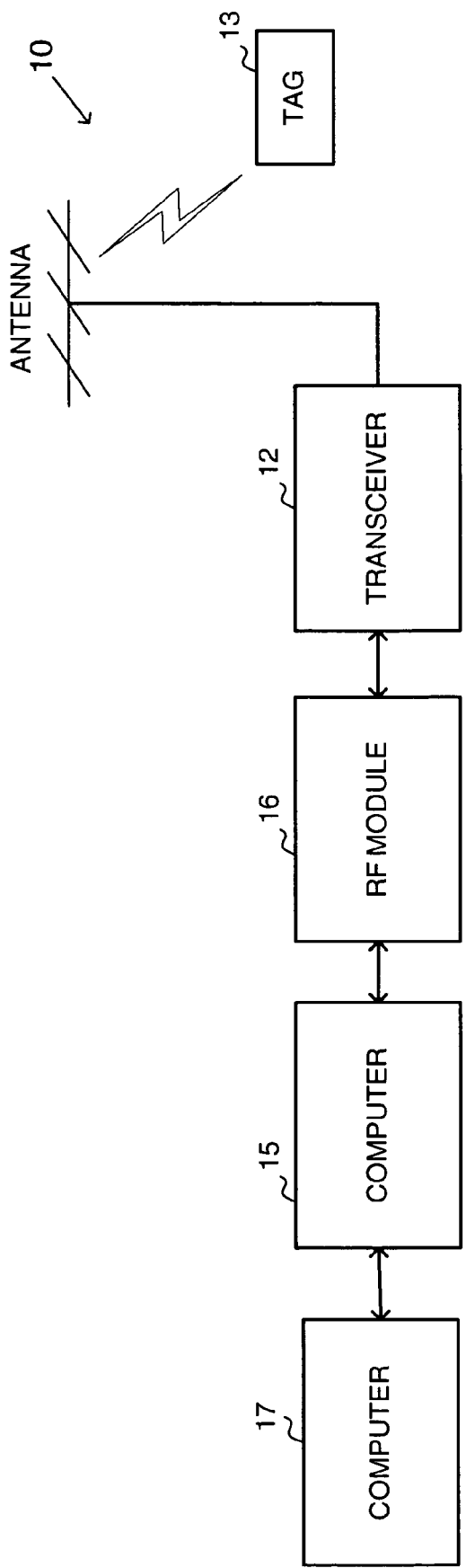
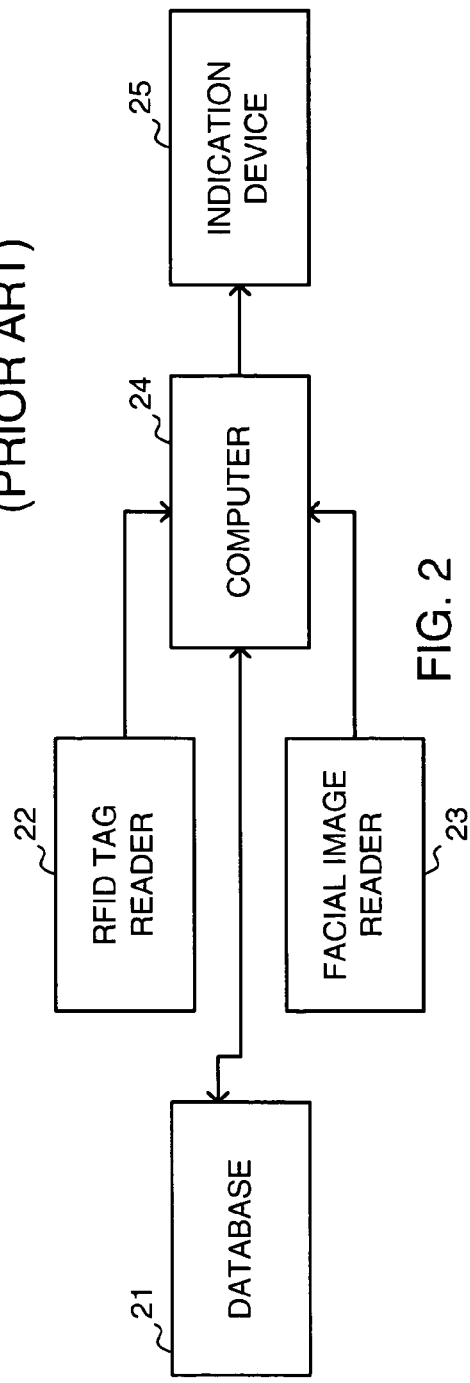
FIG. 1 (PRIOR ART)
FIG. 2

DISTRIBUTED STAND-OFF VERIFICATION AND FACE RECOGNITION SYSTEMS (FRS)

This application is a continuation-in-part of U.S. patent application Ser. No. 10/655,124, filed on Sep. 5, 2003, now U.S. Pat. No. 7,183,895 which is incorporated herein by reference in its entirety.

BACKGROUND

1. Field of the Invention

The present invention relates generally to methods and systems for security identification, and more particularly, to methods and systems for personnel biometric verification.

2. Background of the Invention

Security access control is an important issue for maintaining the safety of individuals and facilities. In a typical gate security system for a large facility, personnel must show their ID cards and/or display authorization tags on vehicles or on the person in order to gain access to the facility. In some cases, where a guard is not located at the gate, personnel can use a data card, such as an electronic data card, to release a gate to gain access to the facility. Once inside the facility, personnel must typically use the data card to open doors to enter into specific secured areas.

One well-known type of security access control system is radio frequency identification (RFID), which is illustrated in FIG. 1. RFID system 10 comprises three basic elements: an antenna or coil 11, a transceiver 12 (with decoder) and a transponder 13 (i.e., an RFID tag) electronically programmed with unique identification information. Antenna 11 emits radio frequency signals to activate tag 13 and read and write data to it, and functions as a conduit between tag 13 and transceiver 12. Antenna 111 can take on various shapes and sizes. For example, antenna 11 can be built into a door frame to receive tag data from persons or things passing through the door, or mounted on structures such as an interstate toll booth to monitor the traffic passing on a highway. Antenna 11 is often packaged with transceiver 12 and decoder (not shown) to function as a reader (or interrogator), which can be configured either as a handheld or a fixed-mount device. The reader emits radio waves in a range of one inch to 100 feet or more, thereby establishing a predetermined electromagnetic zone. When an RFID tag passes through the electromagnetic zone, the reader decodes the data encoded in the tag's integrated circuit and the data is passed to a host computer 15 via an RF module 16 for processing. Generally, RFID tags 13 can be either active or passive. Active RFID tags are powered by an internal battery and are typically readable and rewriteable. In a typical read/write RFID system, an active RFID tag delivers a set of instructions to a machine, and the machine then reports its performance to the tag. In contrast, passive RFID tags operate without a separate external power source and obtain power generated from the reader.

A significant advantage of RFID systems is the non-contact and non-line-of-sight nature of the technology. In operation, when a person or subject carrying an RFID tag passes through a check point, the reader reads and decodes the data stored in the RFID tag and sends the decoded data to a computer for processing. RFID tags can be read through a variety of substances such as snow, fog, ice, paint, and other visually and environmentally challenging conditions. RFID tags can also be read under challenging circumstances such as when vehicles pass points at relatively high speeds. A typical reader can respond to an RFID tag in less than 100 milliseconds.

As mentioned above, RFID systems have been used to control facility access through a gate. In such a case, individuals carry an RFID tag or display an RFID tag in their vehicle. A reader composed of a transceiver and an antenna is installed at or near the gate so that when the individual is close to the gate, the reader reads the data embedded in the tags and sends the data to a computer for identification. If the data from the tag indicate that the individual or the vehicle is permitted entry, the gate will open to allow the individual or vehicle to enter. On the other hand, if the data shows that the individual or vehicle is not permitted entry, the gate will remain closed. In some cases, a guard will stop the vehicle to acquire more information from the individual or driver of the vehicle. An indication device 25, such as a red/green light, may also be provided.

Reliance solely on an RFID system for identification, however, does not provide adequate security. Since the computer only matches the data of the RFID tag with those stored in a database, it is possible that the person who is carrying a valid RFID tag is, in fact, not authorized to gain access. Thus, a more advanced identification system is required.

Biometric verification is now being employed more frequently to verify personnel identification. Such systems typically comprise a database storing personal biometric information, such as facial templates or features, finger prints, hand geometry, iris prints, thermograms, and skin colors of personnel. In a typical face imaging biometric system, the system takes an image or an image sequence of a person and then performs a "one-to-many" verification database search against the images stored in the database. This is done using 2D or 3D imaging technology. However, such a one-to-many search is very slow and often unreliable. Furthermore, present biometric verification systems typically require facial verification in a benign lighting and background environment with no relative facial movement. That is, the person who is requesting access must either stay still or move in a prescribed fashion while the system takes his/her image, or the individual must present their fingers or iris in direct contact to a biometric reader. This presentation requires direct contact and increases the overall time needed for completing the verification task.

As automated and higher security is increasingly demanded, an overall security system must be provided to adequately improve a facility's security posture, while minimizing the negative effects to work efficiency and quality of work life. Due to the disadvantages of excessively long waiting times and unreliable results mentioned above, currently employed Facial Recognition Systems (FRS) and RFID systems cannot yet uniquely satisfy fast and accurate verification requirements. Thus, a method and system that can more efficiently and rapidly identify personnel and/or vehicles is required.

BRIEF SUMMARY OF THE INVENTION

The present invention provides a fast and secure verification method and system that can dynamically identify vehicles and/or personnel by combining RFID and advanced facial detection and recognition techniques. Significantly, the method functions without requiring a vehicle and/or an individual to be in a particular place or posture, or come into physical contact with a biometric device.

More specifically, the present invention provides a method and system for dynamic stand-off biometric verification, in which a tri-band imaging scheme is employed to detect and recognize the face of an enrolled individual whose physical ID and an assigned RFID tag are related in an enrollment database.

In accordance with one embodiment of the present invention, a method for providing dynamic security verification comprises storing data regarding personal information and a face print (template) of the person in a database, wherein the face print is represented by numerical codes of a face digital image of the person. The method further comprises recording data regarding the personal ID information in a radio frequency identification (RFID) tag, reading data from the RFID tag, comparing the data with those stored in the database, retrieving a face print (usually a template) corresponding to the data read from the RFID from the database, and scanning (imaging) the face of the person in two near-IR bands in the reflective region of the spectrum to obtain two facial images. These two facial images comprise a low (reflective IR) band facial image and an upper (reflective IR) band facial image. The method then performs a weighted subtraction of the two facial images (fusion), and thresholds the resulting image to obtain an image of the exposed skin of the person. The method also performs a video scan of the face of the person, overlays the thresholded image (skin image on the video image (registered)), performs a model-based approach to determined the face part of the skin in the video image (face detection) and then compares the detected face with the retrieved face print.

In accordance with another embodiment, the face of the person (i.e., three-band facial images: low near-IR band, upper near-IR band, and the visible band mentioned above) is captured by a Tri-Band Imaging (TBI) system. Because of the common optics, the resulting three simultaneous images of the face of the person are precisely registered. If any of the associated three cameras operates with its own optics, the registration process must be performed algorithmically or otherwise.

In accordance with still another embodiment, a system for dynamical stand-off verification comprises an RFID tag on which an ID number is stored, a computer database for storing data regarding information and face prints and other personal information of a plurality of individuals, an RFID tag reader for reading the ID from the RFID tag, a facial recognition system for scanning the face of the personnel and obtaining facial images for the personnel, and a computer for processing the data read by the RFID tag reader and the facial images obtained by the facial recognition system. The IDs of the vehicle and driver read by the RFID reader and the scanned facial images are sent to the computer. The computer, according to the received RF IDs, retrieves the vehicle ID and personnel ID from the database and determines if the received ID matches with stored ID's. The computer also processes the facial images from the TBI camera to obtain a final facial image, retrieves stored images from the database and compares the two.

In accordance with another preferred embodiment, the facial detection and recognition system comprises a near-IR illuminator for generating near-IR light, an illumination adjustment module for adjusting the near-IR light based on environmental lighting conditions, a TBI camera for precise face detection and location, and a computer for processing the facial images to complete the verification process.

The present invention also provides alternative embodiments of methods and systems for dynamic and stand-off verification. One alternative embodiment of the present invention is to store a face template of an individual in an RFID personal tag along with personal information of the individual. The personal information of the individual is also stored in a database that is coupled with a computer. The computer can be a central host computer of a facility or a local computer at a control gate. When the individual passes through a sensing point, a RFID tag reader reads data from the RFID personal tag and sends the data to the computer for further processing. The computer decodes the data, relates a read RFID number to the information stored in the database, and decodes/decrypts the face template that is stored in the RFID personal tag. Substantially simultaneously, a facial recognition system dynamically takes a picture of the individual and obtains a facial image of the individual. The facial image is also sent to the computer. The computer then compares the decoded face template with the facial image for biometric verification.

The present invention may also provide a method for providing dynamic security verification. The method comprises recording data regarding information and a face print of a person in a RFID device that is carried by the person, reading the RFID device and relating a read RFID number to information stored in a database, dynamically obtaining a facial image of the person, retrieving the face print from the RFID device, and comparing the retrieved face print with the facial image of the person.

In accordance with still another embodiment of the present invention, the method for providing dynamic security verification at a facility can be performed using only local computers located at control gates or, for example, on each floor of a building.

BRIEF DESCRIPTION OF THE DRAWINGS

FIG. 1 depicts a prior art RFID system.

FIG. 2 is a schematic block diagram of a security system in accordance with a first embodiment of the present invention.

DETAILED DESCRIPTION OF THE INVENTION

Figure 3:
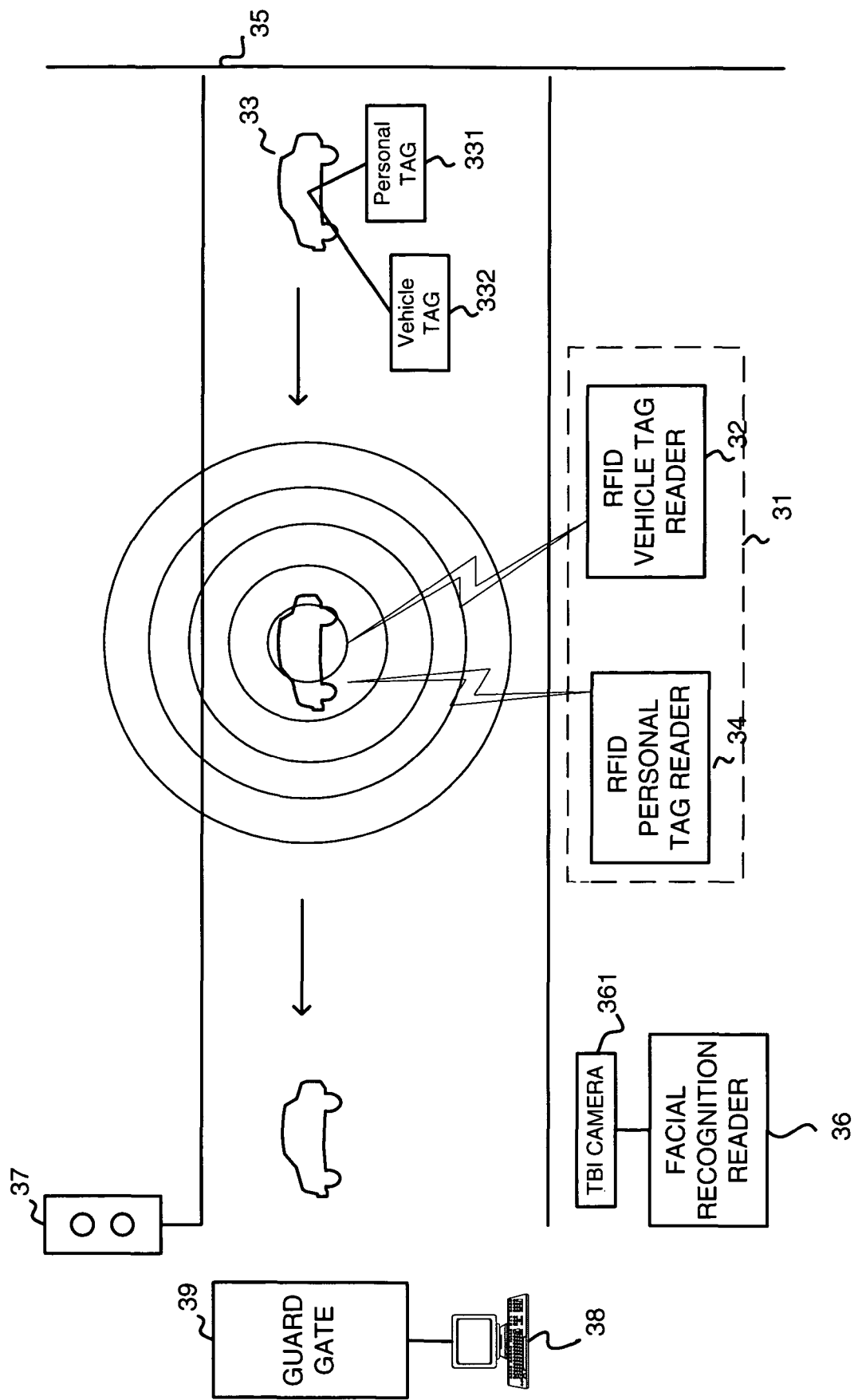
FIG. 3 is a schematic diagram of a security system in accordance with a second embodiment of the present invention, in which the security system is employed at a main gate of a facility to control entry of vehicles.

The method and system of the present invention leverage RFID and dynamic biometric verification techniques to provide secure and fast access control solutions. In accordance with the present invention, the method and system preferably utilize a tri-band imaging (TBI) system that can dynamically capture a face within the context of an ambiguous image frame. The resulting facial image is then uniquely linked by information gleaned from an RFID tag to a stored facial image template in a database.

Since the present invention utilizes RFID to identify vehicles and personnel in combination with a dynamic facial recognition technique to identify face prints of the personnel, the present invention is capable of capturing key vehicle information and biometric data while a vehicle is moving at relative high speeds. According to the present invention, a dynamic facial recognition biometric scheme can scan a facial image of a subject, even at vehicle speeds up to about 40 miles per hour. An RFID scheme can read data from RFID tags at an even higher rate. Therefore, the present invention is particularly beneficial for use as a gate access control system for vehicles and personnel at a main gate of a facility, such as a military base, a governmental office or other locations that require increased security measures. The present invention, however, is not limited to gate access control applications. For example, the dynamic biometric verification of the present invention can also be beneficially used inside an office building to control personnel entering into different work areas. Furthermore, by double-checking the identification of a person by matching the RFID information and the facial information, the method and system of the present invention are capable of providing more secure identification.

FIG. 2 is a schematic block diagram of a security system in accordance with a first embodiment of the present invention. The security system of FIG. 2 comprises a central computer (not shown) that preferably first stores relationship information of personnel and (if desired) their vehicles, as well as the personnels' biometric features in a database 21. This function can also be performed by (local) computer 24. The relationship information of the personnel and their vehicles may include, for example, the license plate numbers, model types and colors of the vehicles. The biometric features of the personnel may include, for example, their facial images/photographs, their processed templates, and other data such as racial information (for example, facial skin and features) and cultural information (for example, the wearing of hats, hair styles, etc.). In accordance with the present invention, the facial information may be encoded by an exemplary local feature analysis (LFA) algorithm, which maps a face and creates a "face print" that is a unique numerical code for that face. Such techniques are well known in the art. After all the information has been stored in database 21, RFID tags (not shown) on which is recorded personnel unique ID numbers, are given to the personnel for carrying and/or displaying on their vehicles. A vehicle RFID tag uniquely identifies a vehicle, and a personnel RFID tag that uniquely identifies the person who drives or owns the vehicle. The RFID vehicle tag may be mounted on the vehicle and the RFID personnel tag may be carried by the person.

The system of FIG. 2 further includes an RFID tag reader 22 and a facial image reader 23, such as a TBI camera. The RFID tag reader 22 is used to read data from RFID tags carried by personnel and/or mounted on vehicles, such as the RFID vehicle tags and the RFID personnel tags mentioned above. RFID tag reader 22 may include an RFID vehicle tag reader and an RFID personnel tag reader (both of which will be described with reference to FIG. 3) for reading data from the RFID vehicle tag and the RFID personnel tag, respectively. In one possible implementation, the RFID vehicle tags may be the passive type that do not have batteries, and the RFID personnel tags may be the active type, which includes batteries, as described with respect to FIG. 1. Facial image reader 23 is used to take a digital facial image of a person who intends to pass through an access gate.

The data read by readers 22 and 23 are then sent to computer 24 for further processing. Computer 24, after receiving the data, decodes the data received from RFID tag reader 22, retrieves stored vehicle information and personnel information from database 21 that correspond to decoded data, and performs a matching process to see if the decoded data matches with stored information. Moreover, computer 24 retrieves a stored face print from database 21 based on the decoded data obtained from RFID tag reader 22 and compares the stored face print with the facial image obtained from facial image reader 23. If all the information matches, then indication device 25 indicates that the vehicle and personnel are authorized to enter. If any of the information does not match with stored data, indication device 25 denies access and/or indicates that a further investigation is necessary. In one embodiment of the present invention, the indication device 25 may be an indication light. In another embodiment of the present invention, the indication device 25 may be a lock controlling device that releases a lock when the vehicle and/or personnel are authorized entry, and keeps the lock locked when any of the vehicle data, personnel data and facial image does not match with stored information.

FIG. 3 shows an exemplary security system in accordance with a first embodiment of the present invention. The security system of FIG. 3 is employed at a main gate of an organization or company to identify vehicles and drivers. Any vehicle (such as vehicle 33) and personnel who intend to pass through gate 39 is required to carry passive RFID vehicle tags 332 and/or active RFID personnel tags 331 (although both devices could be active or both could be passive.) The security system includes passive RFID vehicle tag reader 32 and/or active RFID driver tag reader 34 that are installed at a distance from gate 39 for reading the RFID vehicle tags carried by vehicle 33 and the RFID personnel tags carried by personnel riding in vehicle 33. Although the passive RFID vehicle tag reader 32 and the active RFID driver tag reader 34 are separate readers in the embodiment, these two readers may be also included in a single reader 31. To ensure a secured identification, the system also preferably includes facial recognition system 36 that is installed closer to gate 39 for scanning facial images of the personnel in vehicle 33. The system further includes a computer 38 that is installed in a guard booth or a control office at gate 39 and is preferably remotely connected with a central computer (not shown).

In operation, RFID vehicle tag reader 32 and RFID personnel tag reader 34 are arranged at locations close to sensing point 35. Therefore, when vehicle 33 passes through sensing point 35, such as a light beam, passive RFID vehicle tag reader 32 is first activated to read data from the RFID vehicle tag. Next, active RFID personnel tag reader 34 is activated to read data from the RFID personnel tag. The data read by readers 32 and 34 are immediately recorded and sent to computer 38 for further processing. It is noted that those data can be temporarily recorded in a database of the central computer or in a local database of computer 38. After an identification is complete, the data can be erased immediately or erased automatically after a period of time. Finally, when vehicle 33 reaches the position of facial recognition reader 36, a digital image camera such as TBI camera 361 installed in association with facial recognition system 36 takes a facial image of the driver, creates a face print for this particular driver, and sends the face print to computer 38.

After gathering all the data sent from readers 32, 34 and 36, computer 38 then retrieves information regarding the vehicle tag ID and the personnel tag ID sent from readers 32 and 34 to check if the read IDs match with the IDs stored in the database. Computer 38 also compares the face print which was just created with thousands of face prints stored in the database for a facial recognition. However, in a preferred embodiment, the computer 38 retrieves a stored face print which corresponds to the RFID data read by readers 32 and 34 to compare the stored face print with the just-created face print for a one-to-one matching. If the information matches, gate 39 will be opened to allow vehicle 33 to enter. If information does not match with data stored in the database, vehicle 33 can be stopped for further verification. The system of FIG. 3 may further include an indication light 37 which illuminates, for example, a green light when the driver and vehicle are authorized entry (authenticated), or a red light when unauthorized vehicle, unauthorized individual or incompatible face print is detected.

In some situations, there may be more than one person riding in vehicle 33. In this case, active RFID reader 34 and facial recognition reader 36 substantially simultaneously read each individual's RFID personnel tag and their facial images and create their individual face prints when vehicle 33 passes through readers 34 and 36. As mentioned above, after computer 38 receives all the data from readers 32, 34 and 36, computer 38 retrieves the stored data from the database for matching and then indicates if those individuals and vehicle are authorized to enter the gate.

Figure 4:
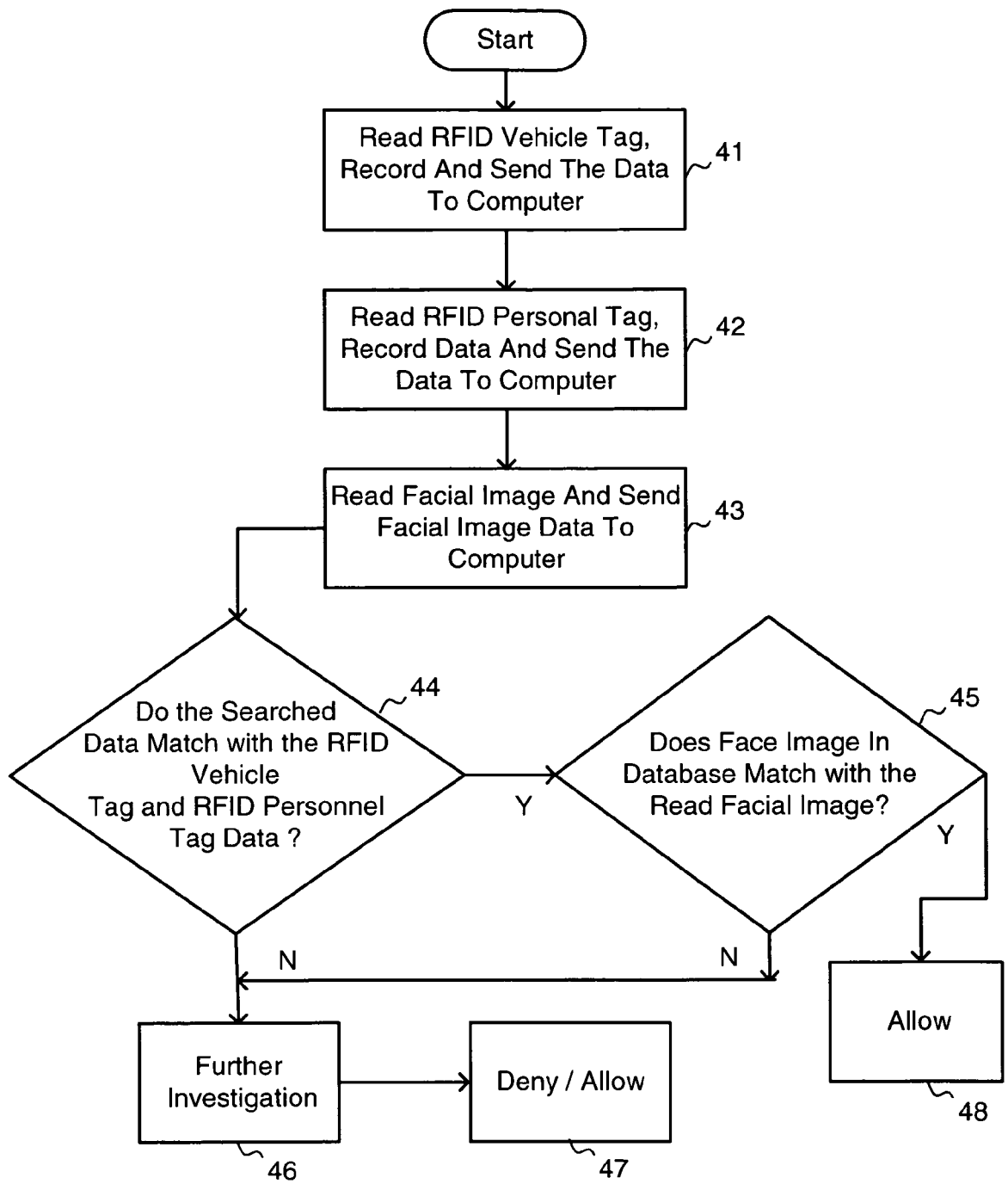
FIG. 4 is a flow chart showing an exemplary security identification method in accordance with the present invention.

A dynamic stand-off biometric verification method in accordance with the present invention is explained below with reference to FIG. 4. When vehicle 33 passes through sensing point 35, it actives RFID vehicle tag reader 32, RFID personal tag reader 34 and facial recognition reader 36. As readers 32, 34 and 36 are arranged in an order from a distance to gate 39, RFID vehicle tag reader 32 first reads data from RFID vehicle tag. The data is then recorded and sent to computer 38, as shown at step 41. At step 42, RFID personal tag reader 34 reads data from RFID personnel tag. As indicated in step 41, the data is also recorded and sent to computer 38. At step 43, when vehicle 33 finally reaches reader 36, camera 53 (shown in FIG. 5) takes images of personnel in the vehicle. The images are also recorded and sent to computer 38 for further processing. Next, at step 44, computer 38 decodes the data read from readers 32, 34, and 36, retrieves relevant data from database and compares those data. The relevant data may include information about vehicle 33, information about personnel who are riding in vehicles 33 and their face prints that are stored in the database. When the data read from readers 32 and 34 match with the retrieved relevant data, the process moves to step 45. At step 45, computer 38 processes the facial images, detects the faces, and compares the detected faces with the retrieved face prints. In the embodiment, if any one of the data read from readers 32 and 34 and the recognized face at steps 44 and 45 do not match with the retrieved relative data from the computers database, a guard is preferably available to stop vehicle 33 to ask for more identification information, as shown at step 46. In another embodiment, to maintain smooth traffic flow, the vehicle may be directed to another area which is separated from gate 39. A guard at this separate area may stop the vehicle and ask for more identification information. Upon investigation of other identification information, the guard can then decide if vehicle 33 and personnel are to be granted or denied entry through gate 39, as shown at steps 47 and 48.

Moreover, in accordance with the present invention, the matching process performed by computer 38 is preferably accomplished in, perhaps, less than 1 second, so that a guard at gate 39 can react and stop the vehicle in time should the vehicle and/or personnel not be authenticated. So that this is possible, RFID reader 32 and 34, and facial recognition reader 36 are preferably installed far enough forward of gate 39. In a preferred embodiment of the present invention, when passing by facial recognition reader 36, it is not necessary for the driver to stop the vehicle or stay still for reader 36 to take the facial image. As the capture of facial image and the comparison process can be completed in a very short time, when the vehicle reaches gate 39, computer 38 has determined if this vehicle and/or driver are authenticated and has gate 39 react accordingly. This feature is beneficial because the system verifies the vehicle and personnel so rapidly that traffic congestion at the gate can be avoided. Furthermore, because the system described herein is non-invasive, personnel in vehicles hardly notice the higher security level that is achieved.

To provide efficient facial recognition, the present invention preferably employs a facial recognition scheme that uses a near-infrared light spectrum to scan facial images by sensing the reflective IR light of human faces. The reflective near-infrared (near-IR) light spectrum scheme avoids a characteristic problem found in conventional visual spectrum systems in which a computer system may intermittently fix on, and attempt to analyze a non-facial portion of the image. The facial recognition scheme of the present invention can quickly locate a face out of surrounding backgrounds so that the biometric data can be more efficiently captured and compared to that in the database. In turn, the processing speed of the facial recognition aspect of the system is greatly reduced.

More specifically, the facial recognition scheme of the present invention preferably uses a tri-band imaging (TBI) system, which uses common optics in low band near-IR, high band near-IR and visual band to analyze, detect and match a face.

Figure 5:
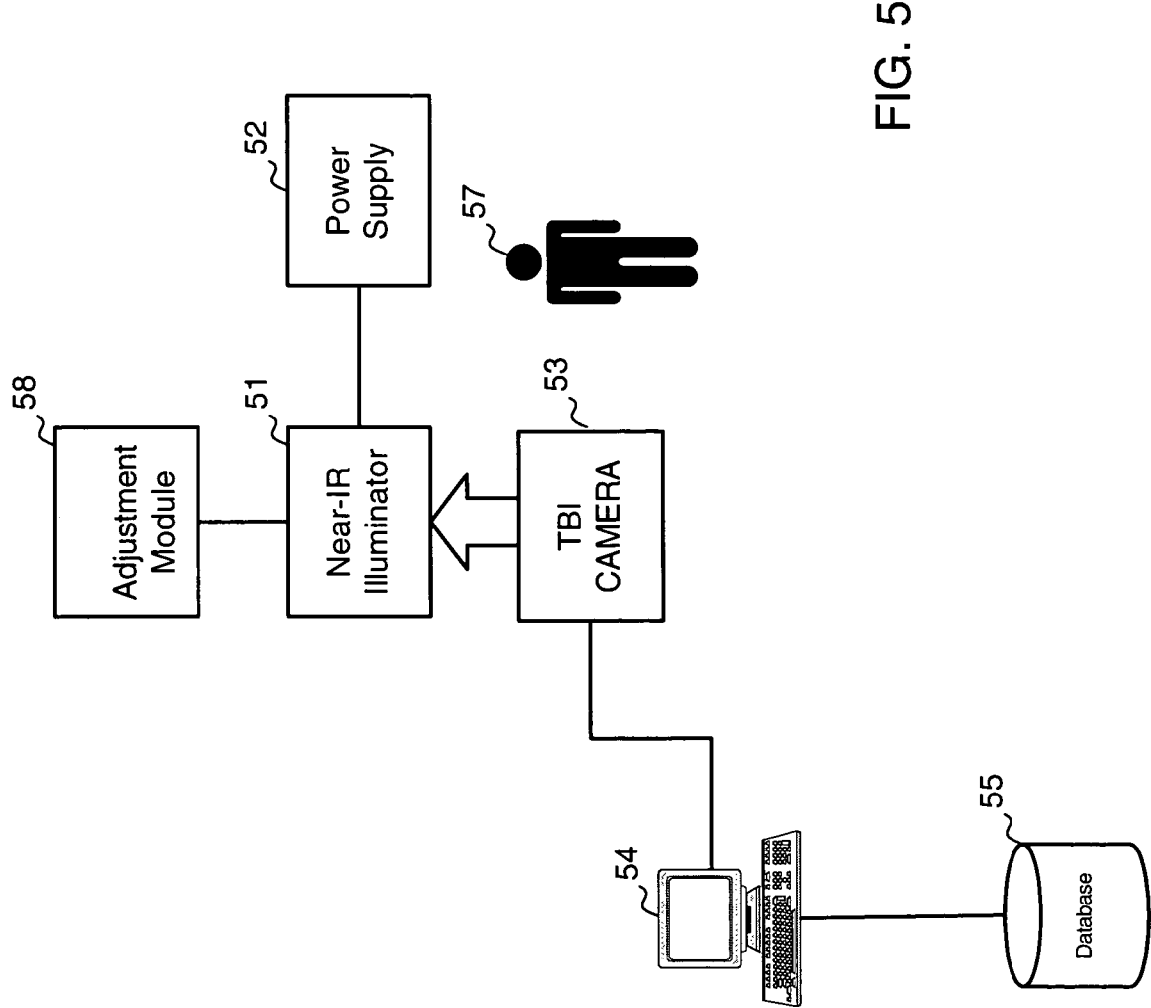
FIG. 5 is a schematic diagram showing an exemplary facial verification system in accordance with the present invention.

FIG. 5 is a schematic diagram of a facial recognition system that is preferably used in the present invention for identifying a facial image of a subject. The facial recognition system includes near-IR illuminator 51 for generating near-IR light with both high wavelength bands and low wavelength bands on subject 57 (which may be a person or several persons), a power supply for supplying power to near-IR illuminator 51, and a TBI camera 53 for taking three digital images of subject 57. The facial recognition reader 36 of FIG. 3 preferably employs the facial recognition system of FIG. 5. The system may also include an illumination adjustment module 58 that evaluates current luminance level in the scene and adjusts power output from power supply 53 to change a light level of near IR illuminator 51. After facial images of subject 57 are taken, the images are then sent to computer 54 (same as computer 38 in FIG. 3) for processing to detect the face. Next, computer 54 searches database 55 for stored face prints that correspond to data read from RFID personnel tag and/or RFID vehicle tag and compares the face print just obtained with stored face print/face prints.

Figure 6:
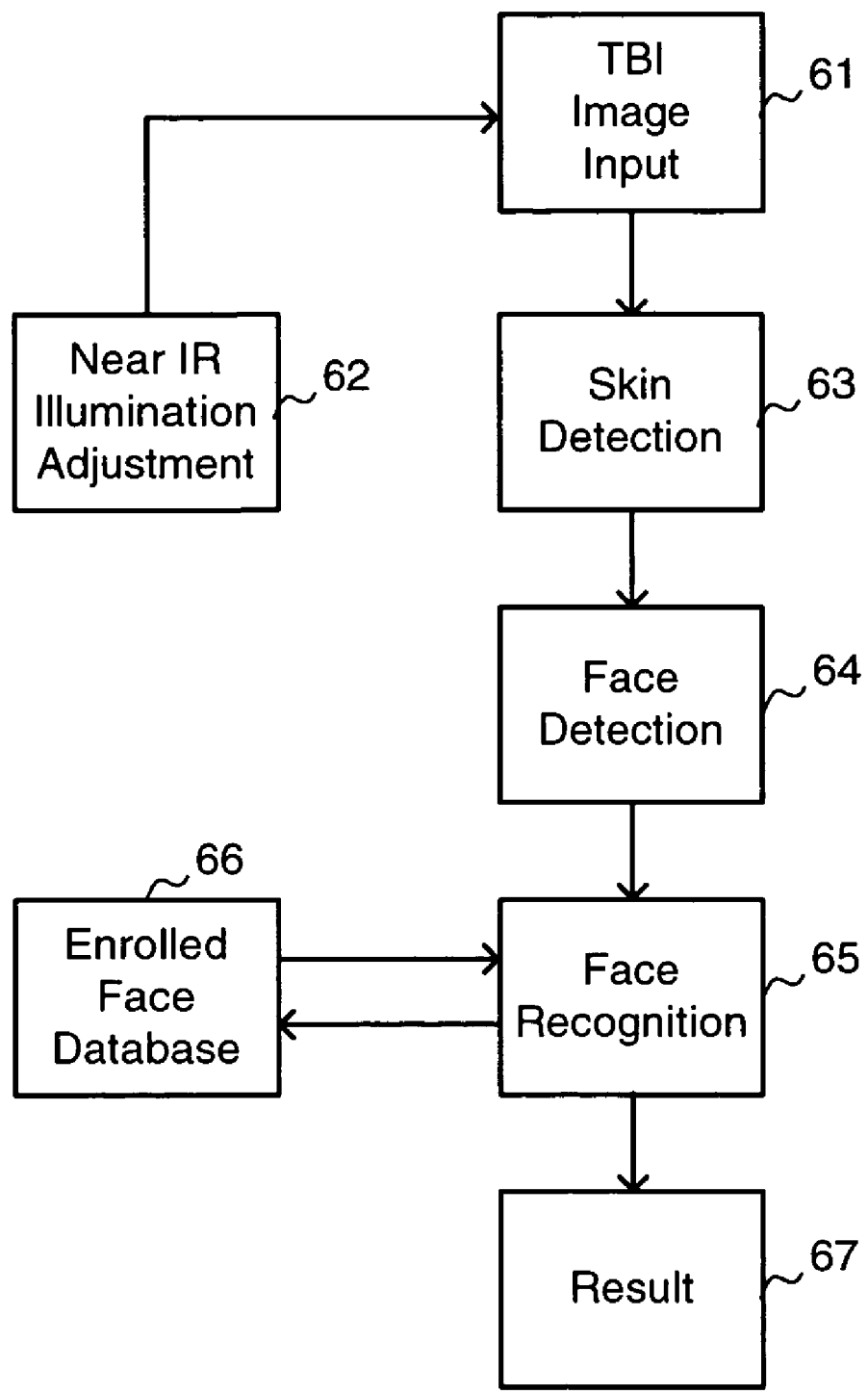
FIG. 6 is a flow chart that illustrates an exemplary facial verification method employed by a system like that shown in FIG. 5.

FIG. 6 shows a flow chart of a facial recognition method that can be practiced with the system of FIG. 5. As described above, when a vehicle passes a facial recognition reader such as reader 36 in FIG. 3, camera 53 takes pictures of a driver in the low near-IR band and high near-IR band. Images obtained by these two light bands are then sent to computer 54 for processing, as shown at step 61. Furthermore, illuminator adjustment module 58 constantly detects the luminance level at the scene and adjusts the illumination level of illuminator 51, at step 62. Computer 54 first performs a series of operations to isolate the skin in the images. Next, at step 64, computer 54 performs multi-band extraction operations to detect the face. As explained more fully below, the skin detection and face detection steps are preferably performed via tri-band image recognition. At step 65, a face is detected. At the same time, at step 66, computer 54 retrieves a face print from database 55 and compares the retrieved face print with the detected face. After a matching comparison, a result showing the recognized face image matches or does not match with the retrieved face print is obtained, as shown at step 67. If it matches, a gate (such as gate 39 of FIG. 3) or a door (not shown) is released to allow vehicle and/or individuals to enter. If it does not match, the gate or door preferably remains locked. As described above, computer 54 can retrieve the face print from database 55 according to data read from RFID vehicle tag and/or RFID personal tag that subject 57 drives and/or carries to perform a one-to-one matching comparison process. Computer 54 can also retrieve a number of face prints from database 55, thereby performing a one-to-many matching comparison process.

Figure 7:
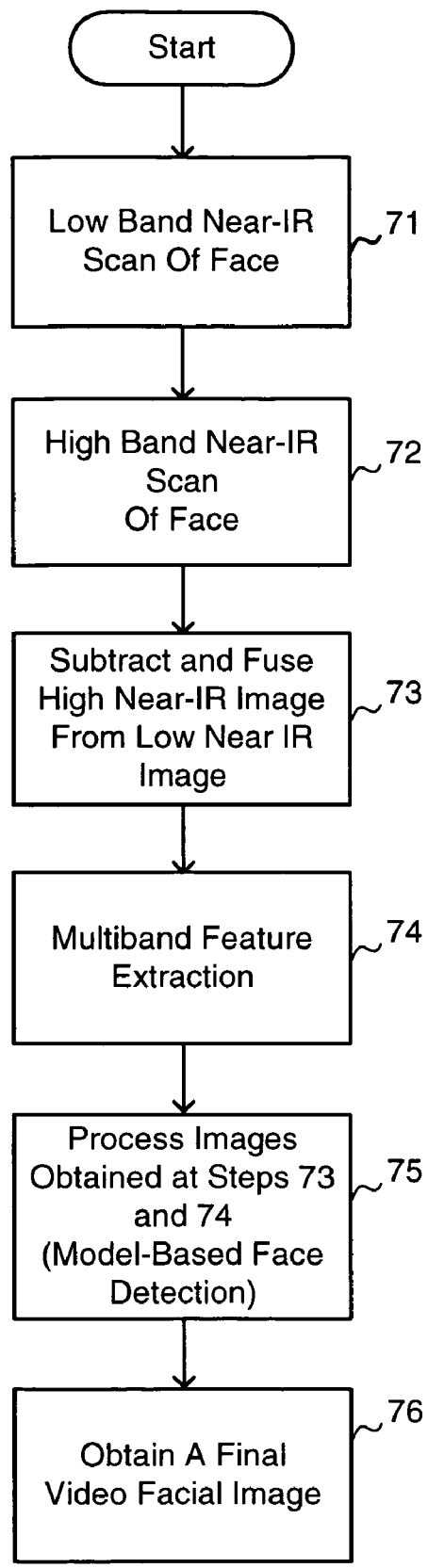
FIG. 7 is a flow chart that illustrates an exemplary tri-band-based face detection method employed by the method illustrated in FIG. 6.

FIG. 7 further explains a tri-band image detection and recognition process employed in the steps shown in FIG. 6. As described above, the facial recognition method of the present invention preferably utilizes low band near-IR light, high band near-IR light and visual band light to scan and detect a human face. At step 71, the method scans the facial image with low near-IR light and at step 72, the method scans the facial image with high near-IR light. At step 73, a high band image obtained at step 72 is subtracted (weighed) from a low band image obtained at step 71 and thresholded to obtain a skin image from the two rear-IR images. Furthermore, at step 74, a feature image is extracted from the two near-IR images of steps 71 and 72 by a multi-band extraction scheme. Next, at step 75, computer 54 processes, as necessary, the feature image and the skin image obtained at steps 73 and 74, respectively. Processing may include, e.g., a series of generalized Hough transforms or model-sized algorithms. Such transforms or algorithms often lead to a good approximation of the location of the eyes, eyebrows, nose and mouth. And, based on the distance and relation between these features, a two-dimensional orientation and extent of the face is more easily obtained, at step 76. The obtained face is then compared by computer 54 with a retrieved face print from the database for matching.

Accordingly, the method and system of the present invention can effectively verify personnel and/or vehicles at a control gate by identifying data from RFID tags and matching facial images of the personnel with stored face prints. In addition to the control gate application, the method and system of the present invention can also be utilized in a building for controlling personnel access to different secured work areas. A facial recognition reader such as reader 23 of FIG. 2 can be installed at access control doors of each work area for capturing facial images of personnel. The data read from RFID personal tag and the facial image are then sent to a control computer for a verification process.

Furthermore, it should be appreciated that in the security system of FIG. 3, a second camera can also be installed inside of gate 39 for monitoring vehicle 33 after the vehicle is allowed to enter gate 39. This embodiment provides yet another level of security to the facility. The use of such a second camera is sometimes referred to as post-processing.

In accordance with a preferred embodiment of the present invention, the face prints of the personnel of a facility are pre-stored in templates in a database of a host computer that is remotely connected with a local computer, such as computer 38 of control gate 39 of FIG. 3. The face print templates are generated during an enrollment stage, that is, when the personnel obtains security credentials. In this embodiment, during a biometric verification process, local computer 38 at control gate 39 retrieves face prints from the host computer for comparing with facial images obtained by facial recognition reader 36 near local control gate 39. This embodiment works well when local computer 38 is successfully connected with the host computer. However, when the connection between local computer 38 and the host computer is interrupted, local computer 38 cannot retrieve face prints from the host computer, causing an interruption in biometric verification. This potential problem can be solved by storing the face print templates in local computer 38. Of course, this solution, in accordance with the present invention, requires that local computer 38 have a large storage capacity. Furthermore, as the face print templates are pre-stored in the host computer, the formats of encoding the facial images at facial recognition reader 36 are fixed and specific to the format of the face print templates.

Accordingly, the present invention provides several alternative embodiments. One alternative is to store not only basic information on the RFID personal tags, but also to store the digital face and the face prints themselves, which would normally be stored in a central database of a host computer, in accordance with the previously-described embodiments. These RFID personnel tags, including face prints or image chips, can be referred to as "smart cards."

As control gates require rapid security checks for vehicles, drivers and passengers, storing face prints only in a host computer is not always efficient. For example, a large facility usually has more than one point of entry (i.e., more than one control gate), but has only one host computer storing the face prints of all of the personnel. When there are many vehicles intending to enter the gates at the same time, the speed of retrieving the face prints from the host computer may be detrimentally effected. At worst, if the host computer is "down," local computers at each of the control gates will not be able to connect with the host computer. Under such circumstances, it would become impossible to perform biometric verifications as described above.

Thus, in accordance with a first alternative embodiment of the present invention, a digital face image and/or templates of the face of a person is stored directly on an RFID smart card. As described above, the RFID smart card can be RFID personnel tag 331 like that depicted in FIG. 3, which also stores information about the person, such as the skin tone, the vehicle he/she is driving, etc.

Figure 8:
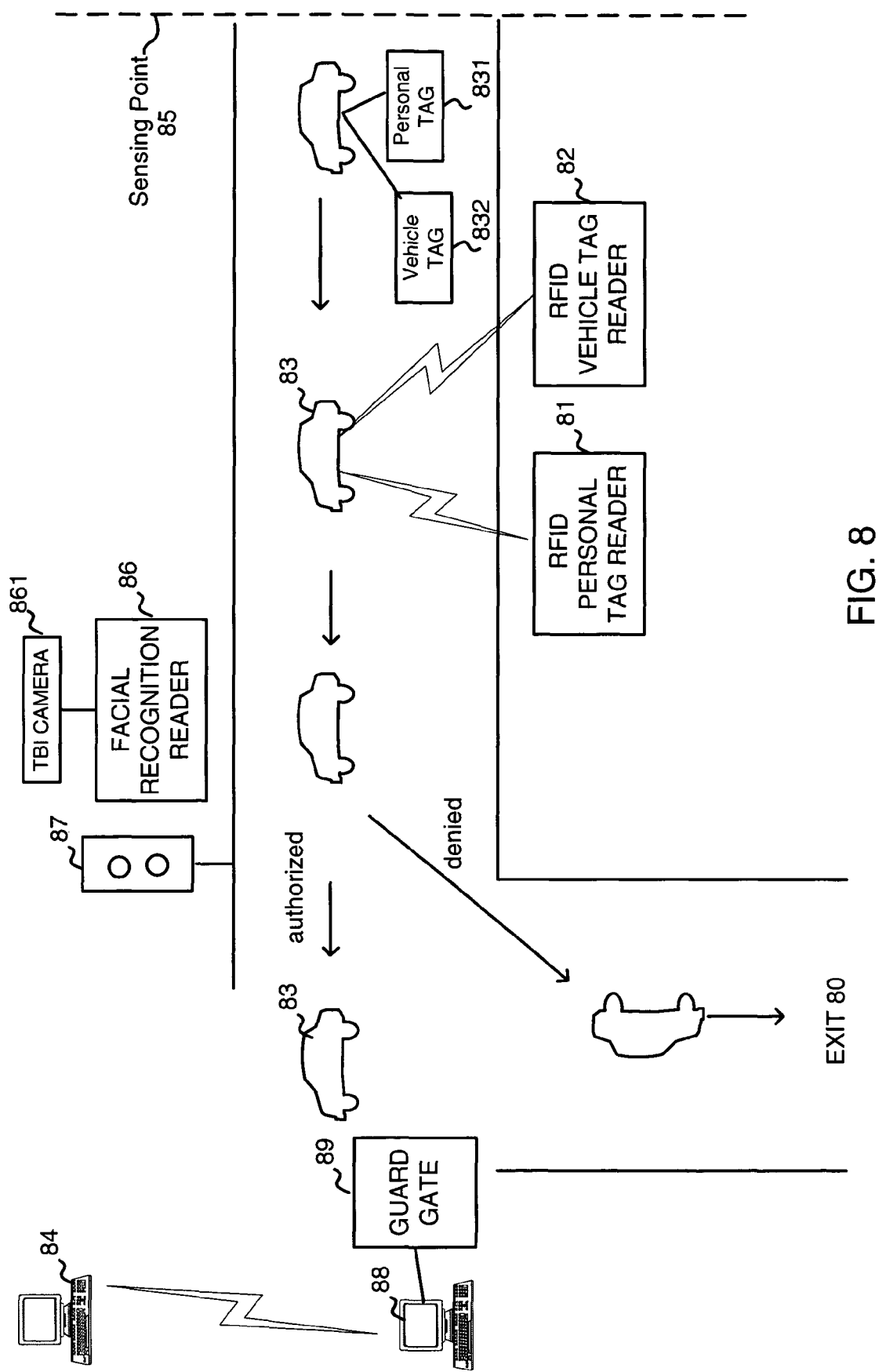
FIG. 8 is a schematic diagram showing a first alternative embodiment of facial verification system in accordance with the present invention.

FIG. 8 is a schematic diagram of an alternative embodiment of the present invention, in which local computer 88 at control gate 89 is coupled with remote host computer 84, and vehicle 83 carries RFID vehicle tag 832 and RFID personal smart tags 831 that belongs to a driver and/or passengers of vehicle 83, respectively. For purposes of explanation, in the following description, there is only a driver (i.e., no passenger) in vehicle 83 and thus only one RFID personal smart card is available for reading. Similar to the embodiment of FIG. 3, when vehicle 83 passes through sensing point 85, RFID vehicle tag reader 82 and RFID smart card reader 81 are activated to read data stored in vehicle tag 832 and smart card 831. When vehicle 83 arrives at a location near to control gate 89, camera 861 takes a picture of the driver. The picture of the driver is then sent to facial recognition reader 86 to be encoded into a facial image. The facial recognition system used by facial recognition reader 86 has been described with reference to FIGS. 5-7 and, thus, its description is omitted here.

The data read by RFID vehicle reader 82 and RFID smart card reader 81 and the facial image obtained by facial recognition reader 86 are sent to local computer 88 of control gate 89 for processing. Local computer 88 is preferably capable of retrieving face prints stored in face print templates of host computer 84 and decoding the face prints that are pre-stored in RFID smart card 831. Therefore, when the connection between local computer 88 and the host computer 84 is interrupted (as shown), local computer 88 can still decode (and perhaps display) the face print from RFID smart card 831.

Local computer 88 then compares the decoded face print with the facial image obtained from facial recognition reader 86 to see if they match. If they match, which means that vehicle 83 and the driver are authenticated, indication light 87 turns green and gate 89 is opened to allow vehicle 83 to enter. If the data do not match, a guard may then direct vehicle to leave via exit 80.

Figure 9:
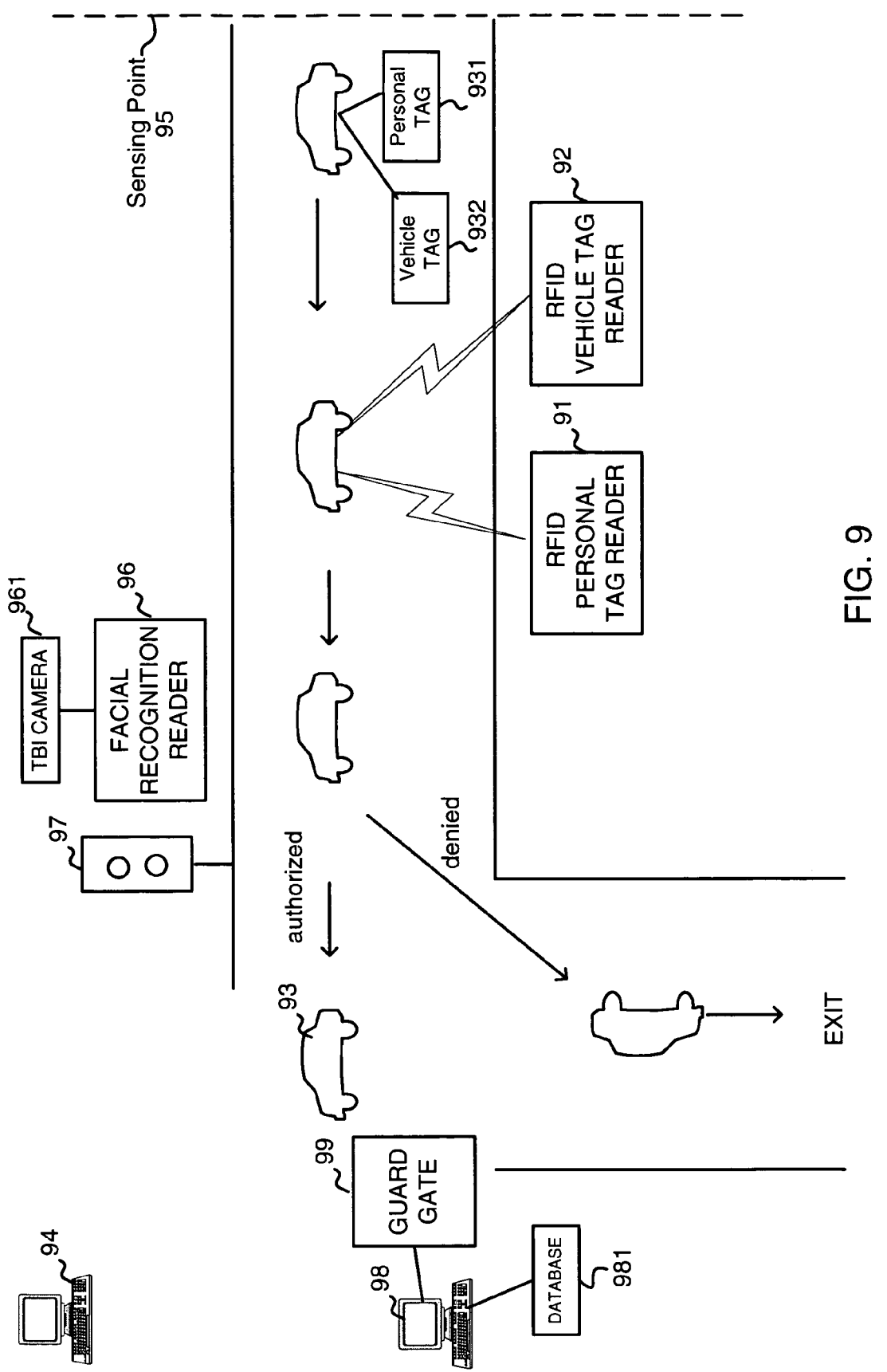
FIG. 9 is a schematic diagram showing a second alternative embodiment of facial verification system in accordance with the present invention.

The local computer may also operate independently from host computer. This case is illustrated in an embodiment shown in FIG. 9. Here, local computer 98 of control gate 99 does not connect with host computer 94. In the preferred embodiment, local computer 98 includes a database 981 that pre-stores data relative to registered vehicles and personnel. Local computer 98 also has the capability of decoding and retrieving face prints from RFID personal smart card 931. When vehicle 93 passes through sensing point 95, data stored in vehicle tag 932 and personal smart card 931 carried by vehicle 93 and the driver are read by RFID vehicle tag reader 92 and RFID smart card reader 91, respectively, and are sent to local computer 98 for further processing. Based on the read data, local computer 98 searches relevant data stored in its database 981. In addition, local computer 98 decodes the face print stored in RFID smart card 931 and may display the decoded face print on its display. Similarly, local computer 98 receives facial image data of the driver that is obtained from camera 961 and facial recognition reader 96. Local computer 98 then compares the decoded face print with the facial image for verification.

Figure 10:
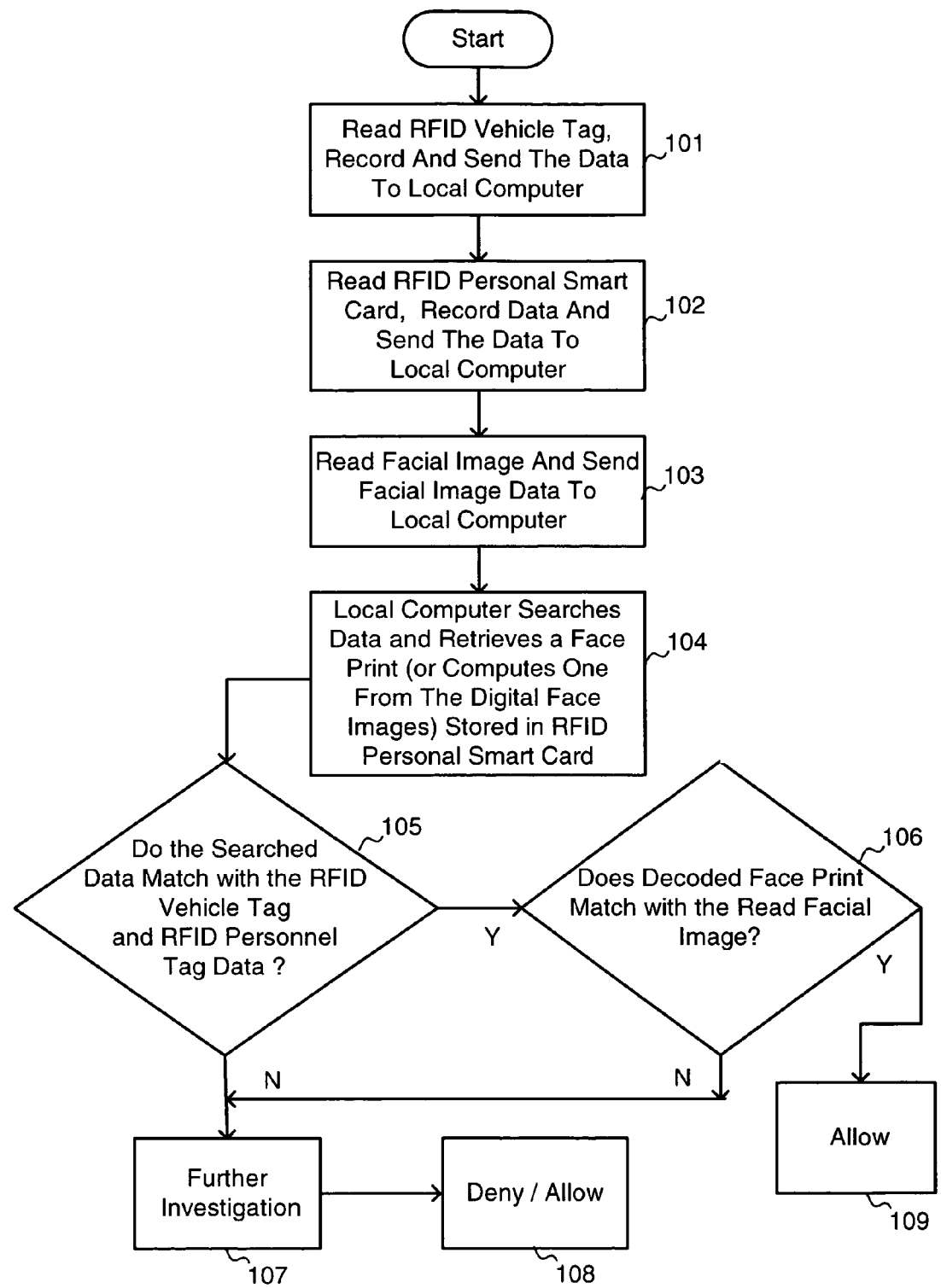
FIG. 10 is a flow chart showing an exemplary security identification method employed at the systems of FIGS. 8 and 9.

An exemplary method executed at local computer 98 to dynamically stand-off biometric-verify the driver of vehicle 93 is illustrated in FIG. 10. Basically, the steps of FIG. 10 are similar to those of FIG. 4, except that in FIG. 10, the vehicle data and personal data are stored in a database of a local computer and the local computer can decode and retrieve face prints that are pre-stored in RFID personal smart cards.

At step 101, RFID vehicle tag reader 92 reads data from vehicle tag 932 and sends the data to local computer 98. Similarly, at step 102, RFID smart card reader 91 reads data and face print data from personal smart card 931 and sends these data to local computer 98 for processing. At step 103, facial recognition reader 96 also sends a facial image data that is generated by processing a facial image taken by camera 961 to local computer 98 for further processing.

At step 104, local computer 98 decodes the data read from RFID vehicle tag 932 and RFID smart card 931 and retrieves relevant data from its database. Local computer 98 also decodes the face print data read from RFID smart card 931 and displays the face print on its display.

At step 105, local computer 98 determines if the data retrieved from its database match with the data read from RFID vehicle tag 932 and RFID personal smart card 931. If these data match, the process moves to step 106, where local computer 98 further compares the decoded face print with the facial image obtain by facial recognition reader 96. At step 106, if the face print and the facial image also match, vehicle 93 and the driver are deemed authenticated, as shown at step 109.

If any of the data read from RFID vehicle tag 932 and RFID personal smart card 931 and decoded face print fails to match with the retrieved relevant data and the facial image obtained by facial recognition reader 96, a guard is preferably available to stop vehicle 93 to ask for more information, as shown at step 107. Upon investigation of other identification information, the guard can then decide if vehicle 93 and personnel are to be granted or denied entry through gate 99, as shown at steps 108 and 109. In another embodiment, to maintain smooth traffic flow, at the investigation step 107, vehicle 93 may be directed to another area which is separated from gate for investigation.

The above unique systems that store the digital images and/or the templates of the face of a person on an RFID smart card provide a hands-free, one-to-one biometric verification, or one-to-many identification, under dynamic motion. Therefore, the system is capable of distributing biometric digital image data (image prints of the face) to local computers and allows the local computer to accomplish the verification or identification of the person. This distribution of facial image data also allows critical access control decisions to be accomplished at the local computer during a loss of connection to the central system. The present invention thus provides a stand-alone system that can be operated independently of the remote central facility.

Furthermore, the face recognition system used in a preferred embodiment is a Tri-band imaging system (TBI) as described in the above embodiment, which can dynamically capture a face (face detection) within the context of an ambiguous image frame. Other face detection technology can also be employed. The resulting facial image obtained by the face recognition system will be uniquely compared to a facial image chip (i.e., face print) stored on the RFID smart card. In accordance with the present invention, the smart card has enough memory to store one or more image chips (digital video facial pictures of the person) and/or face templates. In addition to the image chips, a set of frequently used face recognition system templates can be stored on the card along with corresponding identifying codes so that the receiving host computer or local computers will "know" which face recognition system is being used at any given time. For example, one organization may have facilities located at various places, and these facilities may employ different face recognition systems. By storing various face recognition system templates on a single smart card, the person who carries the single smart card can be recognized and verified at different facilities without the need to reprogram the card or carry different cards. This feature thus allows the use of several face recognition technologies for the same person, so that combined biometrics resulting from the several face recognition technologies can be used.

Thus, the present invention provides a system and method for both dynamic and stand-off biometric verification in the sense that a person can be detected even if driving in a vehicle (dynamic) and, further, in that the person being detected need not actively place themselves in a particular place, or physically touch some device (stand-off) to effect biometric verification.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method for providing dynamic security verification, comprising: recording data regarding information and a face print of a person in a RFID device that is carried by the person; reading the RFID device and relating a read RFID number to information stored in a database; dynamically obtaining a facial image of the person via an image-captured device; retrieving the face print from the RFID device; comparing the retrieved face print with the facial image of the person; and storing in said RFID device a plurality of face recognition templates of different face recognition technologies along with corresponding identifying codes; wherein the face print is retrieved based on the identifying codes stored in the RFID device identifying one of said plurality of face recognition templates for a particular face recognition system technology being used to dynamically obtain said facial image of the person via said image-captured device.

2. The method of claim 1, wherein the facial image of the person is obtained by: scanning a face of the person with low near infrared (IR) light and high near-IR light to obtain a first facial image and a second facial image, respectively; subtracting the second facial image from the first facial image to obtain a skin image of the person, performing a multi-band extraction on the first and second facial images to obtain a third facial image, combining the skin image and third facial image to obtain a final facial image; and comparing the final facial image with the retrieved face print.

3. The method of claim 1, wherein the data regarding the information of the person comprises personal information and vehicle information of the person.

4. The method of claim 1, wherein the face print is stored in a format that corresponds to a predetermined recognition technology.

5. The method of claim 1, wherein the face of the person is scanned dynamically and automatically when the person passes by a reading point.

6. A method for dynamically verifying a person at a control gate, the method comprising: recording data regarding information and a face template of a person in a RFID device that is carried by the person, wherein the information of the person includes personal information and vehicle information that is registered to the person; storing the data along with a RFID number in a database; reading the RFID device and relating the read RFID number to the information stored in the database; associating the RFID device and data stored thereon with the data stored in the database; retrieving the face template from the RFID device; dynamically obtaining a facial image of the person; and comparing the facial image with the retrieved face template to verify identity, wherein the retrieving the face print step and the comparing step are performed by a local computer located at the control gate.

7. The method of claim 6, wherein the database is a database of the local computer.

8. The method of claim 6, wherein the local computer is coupled with a remote host computer.

9. The method of claim 6, wherein a plurality of face recognition templates of different face recognition technologies are stored in said RFID device along with corresponding identifying codes; wherein the face print is retrieved based on the identifying codes stored in the RFID device identifying one of said plurality of face recognition templates for a particular face recognition system technology being used to dynamically obtain said facial image of the person.

10. The method of claim 6, further comprising dynamically verifying a vehicle in which the person is riding, wherein information regarding the vehicle is recorded in an RFID vehicle tag.

11. The method of claim 10, further comprising: reading the RFID vehicle data from the vehicle tag and relating a read RFID number to the information stored in the database; and comparing the read RFID vehicle data and information corresponding to the read RFID number.

12. The method of claim 6, further comprising: storing the face template in the database; and associating the RFID device and face template stored thereon with the face template stored in the database.

13. The method of claim 6, wherein scanning a face of the personnel further comprises: scanning the face of the person by a low near-IR light and a high near-IR light to obtain a first and a second facial image, respectively; subtracting the second facial image from the first facial image to obtain a skin image; performing a multi-band extraction on the first and the second facial image to obtain a third facial image; and combining the skin image and the third facial image to obtain the final facial image.

14. A system for dynamic stand-off verification, comprising: an RFID tag carried by an individual, the RFID device storing personal information of the individual and a face template of the individual; a database for storing data regarding information of a plurality of individuals; an RFID tag reader for reading data from the RFID tag; a facial recognition reader for scanning a face of a person and obtaining a scanned facial image for the person; and a computer for relating a RFID number read from the RFID tag by the RFID tag reader to specific information stored in the database and retrieving the face template of the person stored in the RFID tag, wherein the computer compares the retrieved face templates with the facial image and determines if the retrieved face templates matches the facial image; and further comprising plurality of face recognition templates of different face recognition technologies stored in said RFID device along with corresponding identifying codes; wherein the computer is further configured to retrieve said face print based on the identifying codes stored in the RFID device identifying one of said plurality of face recognition templates for a face recognition system technology being used to dynamically obtain said facial image of the person via said image-captured device.

15. The system of claim 14, wherein the computer is a local computer that is decoupled from a central host computer.

16. The system of claim 14, further comprising a sensor that is activated when the individual passes a sensing line, and the activation of the sensor further activates a reading sequence for the RFID tag reader and the facial recognition reader.

17. The system of claim 14, wherein the personal information stored in the RFID tag includes information regarding the individual and a vehicle in which the individual is driving.

18. The system of claim 14, wherein the facial recognition reader comprises: a near-IR illuminator for generating near-IR light; an illumination adjustment module for adjusting the near-IR light based on environmental lighting conditions; a camera for taking facial images of the individual, and a computer for processing the facial images to obtain a face image.

* * * * *